United States Patent [19]

Tobin et al.

[11] Patent Number: 4,771,435
[45] Date of Patent: Sep. 13, 1988

[54] ROOM TEMPERATURE METAL VAPOR LASER

[75] Inventors: Roderick C. Tobin, Mount Waverley; Erol C. Harvey, Vermont; Alfred K. Anders, Mount Waverley, all of Australia

[73] Assignee: Monash University, Clayton, Australia

[21] Appl. No.: 2,971

[22] Filed: Jan. 13, 1987

[30] Foreign Application Priority Data

Jan. 24, 1986 [AU] Australia .................... PH04332
Nov. 18, 1986 [AU] Australia .................... 65352/86

[51] Int. Cl.⁴ ............................................. H01S 3/03
[52] U.S. Cl. ....................................... 372/56; 372/58; 372/61; 372/88
[58] Field of Search ................ 372/52, 56, 58, 61, 372/60, 87, 88

[56] References Cited

U.S. PATENT DOCUMENTS

4,639,928  1/1987  Wang et al. ...................... 372/87
4,641,313  2/1987  Tobin et al. ...................... 372/56
4,706,257  11/1987 Brunet et al. ..................... 372/58

Primary Examiner—James W. Davie
Assistant Examiner—Xuan T. Vo
Attorney, Agent, or Firm—Finnegan, Henderson, Farabow, Garrett & Dunner

[57] ABSTRACT

A metal vapor laser which has an optical cavity, and a sputtering cell arranged at one end. The sputtering cell has a sputtering surface for sputtering metal deposited on the surface or from which the surface is formed. A gas stream is introduced into the cavity for entraining the sputtered metal into a metal vapor beam and the gas stream is introduced such that the gas stream flows substantially parallel to at least a part of the sputtering surface to ensure that the passage for introducing the gas is aligned correctly relative to the sputtering surface, there is provided an insulative ring formed in two portions defining the passage therebetween and the first portion of the ring is moveable with respect to the second portion thereof to align a passage. Two sources of gas are provided for forming the gas stream and are selectively switched so that each source of gas can be selectively coupled to the cavity for forming a gas stream of a particular variety of gas.

12 Claims, 5 Drawing Sheets

ROOM TEMPERATURE METAL VAPOR LASER

This invention relates to metal vapour lasers and in particular to an improvement to the laser disclosed in U.S. patent application Ser. No. 644,955, now U.S. Pat. No. 4,641,313.

BACKGROUND OF THE INVENTION

A major cause of technical difficulties and limitations in the operation of metal vapour lasers is the method by which the metal atoms are established within the laser discharge volume. Conventional methods of vaporizing the metal to provide metal atoms have limitations.

Direct vaporization of the metal (Walter et al 1966) using either an external oven or discharge heating requires high temperatures, about 1500° C. for copper, to be achieved. High power copper and gold lasers exploit the discharge energy to heat a tube. The need for ovens also makes it difficult to construct the fast discharge circuitry needed for excitation of other potentially interesting self-terminating neutral metal laser transitions.

The use of a volatile compound of the metal (Chen et al 1973), for example a metal halide, reduces the temperatures needed to attain an adequate metal concentration. However, relatively few metals possess suitable compounds. The difficulty in constructing closely coupled discharge circuitry needed for fast discharges in self-terminating lasers, however, still remains. Associated with the use of volatile metal compounds is the need to dissociate the molecule. In the case of neutral transition lasers this requires the use of double or continuously pulsed discharges, with all the limitations that the constraints set by the dissociation-reassociation cycle impose upon the system. In particular, the dissociation process results in an undesirable population of the lower laser level. In contrast, continuous-wave (cw) metal ion lasers use a dc discharge which produces both dissociation and excitation. The dissociation is virtually complete so that the vapour pressure is controlled by tube temperature and consequently the excitation may be separately optimized (Brandt and Piper 1977).

Another commonly used method of metal production is by sputtering the metal atoms from a cathode of the desired material (Gersternberger et al 1980). To date, the metal density required to support laser action has been produced by cathodic sputtering using a hollow cathode discharge. Use of a hollow cathode also greatly increases the extent of ionization in the buffer gas over that found in the more common positive column type gas discharge. This combined with enhancement of charge transfer reactions of the type:

$$B^+ + M \rightarrow B + (M^+)^* + \Delta E$$

where B, B+ and M represent buffer gas atoms, ions and metal atoms respectively and (M+)* represents metal ions in excited states, results in the hollow cathode discharge being particularly suitable for charge transfer metal ion lasers. Indeed, thus far, sputtering has been restricted to cw metal ions lasers, which require relatively high discharge currents (1 to 100 A).

A theory for the operation of this type of hollow cathode ion laser has been developed by Warner et al (1979). In their model the equations for the densities of the rare gas ions, metal vapour atoms and ions are coupled via the charge transfer reaction as above. As a consequence of this the discharge current cannot be independently varied or optimized with respect to the desired metal atom density. This restriction is the major practical disadvantage of sputtering lasers to date.

Only sputtering is applicable to a wide range of metals and can produce a concentration of metal atoms of the order $10^{14}$ cm$^{-3}$ continuously at room temperature.

In existing sputtering lasers, both the sputtering of the metal and the excitation of the lasing transition are accomplished by a single discharge in a static noble gas metal vapour mixture. The conventional methods do not allow separate control and optimisation of the metal vapour concentration and the excitation discharge. The object of the present invention is to provide a metal vapour laser for operation at room temperature which overcomes some or all of the abovementioned drawbacks.

SUMMARY OF THE INVENTION

The present invention may be said to reside in a metal vapour laser having an optical cavity, a sputtering means having a sputtering surface, for sputtering a metal deposited on said surface or from which said surface is formed, means for producing a gas stream for entraining the sputtered metal into a metal vapour beam within said optical cavity characterised in that said means for producing said gas stream produces said gas stream such that said gas stream flows substantially parallel to at least part of said sputtering surface such that the gas stream flows over said part of said sputtering surface to entrain the sputtered metal into said metal vapour beam.

The formation of the gas stream parallel to the sputtering surface so that the gas stream runs over the sputtering surface to entrain sputtered metal into the metal vapour beam, results in a high concentration of metal vapour within the beam which in turn ensures that a high population of metal atoms or ions are excited when a discharge is applied to the metal vapour beam.

Preferably the sputtering means comprises a sputtering cathode which has said sputtering surface and an anode for producing an electrical discharge between said anode and said sputtering surface said sputtering cathode being annular in form and said sputtering surface being formed by a beveled surface portion extending transverse to the longitudinal axis of the optical cavity and a wall surface portion extending from said beveled surface portion substantially parallel to the longitudinal axis of the optical cavity on said cathode which thereby forms an annular sputtering surface.

Preferably said means for producing a gas stream comprises an annular chamber formed in a non-conducting member adjacent said sputtering cathode, said annular chamber having an annular gas passage extending from said annular chamber towards said sputtering surface and substantially parallel with said sputtering surface, said member having a beveled surface adjacent to said sputtering surface which is beveled complementary to said sputtering surface such that said sputtering surface and said beveled surface of the member form an annular V-shaped channel and said gas passage communicates with said beveled surface at a point adjacent the apex of said V-shaped space.

Preferably said anode is located on the opposite side of said member to said sputtering cathode and said member is sandwiched between the anode and sputtering cathode.

A further aspect of the present invention relates to utilization of gases within the metal vapour laser.

In a further aspect the invention may be said to reside in a metal vapour laser having an optical cavity, a sputtering means having a sputtering surface, for sputtering the metal deposited on the surface or from which the surface is formed, means for producing a gas stream or entraining the sputtered metal into a metal vapour beam within the optical cavity, and means for producing a discharge within the cavity to excite the metal vapour beam, characterized in that the means for producing said gas stream includes at least two sources of gas, and switching means for selectively switching each of the sources of gas so that the sources of gas are connected to the metal vapour laser.

This aspect of the invention is extremely important since in lasers of the type described in this application, one type of inert gas, for example, argon, is more suitable for sputtering metal and another type of gas, for example neon, is more suitable for excitation of the metal atoms. Furthermore, one or the other of the types of gases may be much more expensive than the other. By providing two sources of gas and selectively switching in the sources of gas, the system can be synchronized so that the gas which is more suitable for sputtering is supplied to the laser during sputtering and the gas which is more suitable for excitation is applied to the laser during excitation. It takes about 7 milliseconds from the start of the sputtering discharge pulse for the metal vapour beam to be established. Furthermore, excitation of the metal vapour occurs periodically for very short intervals of time, therefore, if a single gas is always used or a mixture of gases are always used there is considerable wastage since the gas is continually being drawn through the laser even though the excitation of the laser occurs periodically for only small time intervals. This is a particular disadvantage when neon is used for excitation since neon gas is very expensive. The present invention enables the gas to be pulsed into the laser only when it is required for sputtering and another gas which is more suitable for excitation can be pulsed in in synchronism with the excitation pulses for exciting the gas. This enables the appropriate of gases to be used for sputtering and for excitation and also reduces the amount of gas which is used therefore decreasing cost and enabling smaller pumps to be used for circulating the gas.

A further aspect of the invention relates to the manner in which a cathode is formed to provide a discharge for sputtering the metal.

This aspect of the invention provides a metal vapour laser having an optical cavity, a sputtering means having a sputtering surface, for sputtering a metal deposited on said surface or from which said surface is formed means for producing a gas stream for entraining the sputtered metal into a metal vapour beam within the optical cavity and means for exciting the metal vapour beam in the cavity, said laser being characterized in that said sputtering means includes a first cathode and a second cathode, said first and second cathodes being spaced from one another and having surfaces which define a hollow cathode, at least one of said surfaces having said metal deposited thereon or being formed from said metal, such that the discharge to sputter said metal occurs between the surfaces of the hollow cathode.

BRIEF DESCRIPTION OF THE DRAWINGS

A preferred embodiment of the invention will be described in further detail with reference to the accompanying drawings, in which.

DESCRIPTION OF PREFERRED EMBODIMENTS

With reference to the accompanying drawings which show a metal vapour laser 10 having an optical cavity 12 which has at one end a sputtering device and means for producing a flow of inert gas generally designated by the reference numeral 14. The other end of the optical cavity 12 has a chamber 16 which communicates with a vacuum pump (not shown) for drawing the gas stream produced at the sputtering device 14 into a beam of metal vapour in the optical cavity 12 in the same manner as disclosed in U.S. patent application Ser. No. 644,955, now U.S. Pat. No. 4,641,313, the subject matter of which is incorporated herein by this reference. In the embodiment of this invention shown in FIG. 1 a second optical cavity 12′ is arranged on the other side of the chamber 16 and the optical cavity 12′ has arranged at its opposite end a sputtering device 14 similar to that shown in FIG. 1. Thus, two beams of metal vapour can be produced in the device shown in FIG. 1, one in each of the optical cavities 12 and 12′. An advantage of this arrangement is that it ensures that the terminating window at each end of the laser tube remains cleans. It should be understood that if desired a single optical cavity 12 could be employed and the other end of the chamber 16 could be closed and provided with a reflective surface or a Brewster window.

Figures 1, 6:
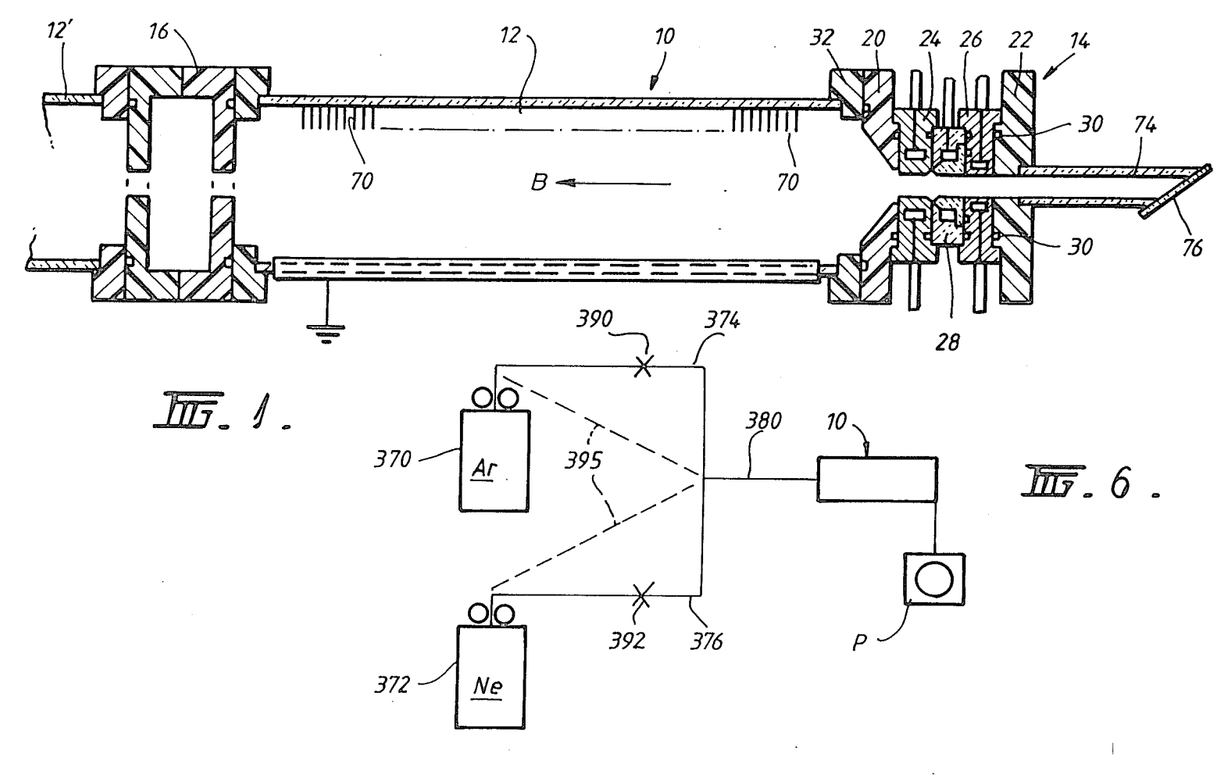
FIG. 1 is a view of a metal vapour laser according to the preferred embodiment of the invention.
FIG. 6 is a view of a gas flow arrangement for use in the embodiment of FIGS. 1 to 4.

The sputtering device 14 includes a pair of support rings 20 and 22. The support rings 20 and 22 are provided with an annular opening. Disposed between the support rings 20 and 22 is a sputtering cathode 24, an anode 26, and an insulative ring 28 disposed between that cathode 24 and anode 26, all of which include a central annular opening. The rings 20 and 22 as well as the cathode 24, anode 26 and insulative ring 28 may have O-rings 30 disposed between them for sealing purposes. The support ring 20 may be coupled to a connecting ring 32 which is secured to the optical cavity 12. The optical cavity 12 can be formed from any suitable material such as glass, PERSPEX or most preferably LEXAN or can use a metal discharge tube which provides a coaxial earth return to minimize the inductance of the discharge circuit in the case of a longitudinal discharge and to provide electrical shielding. The high voltage electrode for the discharge is insulated from the tube and presented close to the metal vapour beam so that the excitation discharge is concentrated on the beam. The support rings 20, 22 and the connecting ring 32 may be formed from nylon and squeezed together by means of bolts (not shown) to sandwich the cathode 24, anode 26 and insulative ring 28 therebetween.

Figure 2:
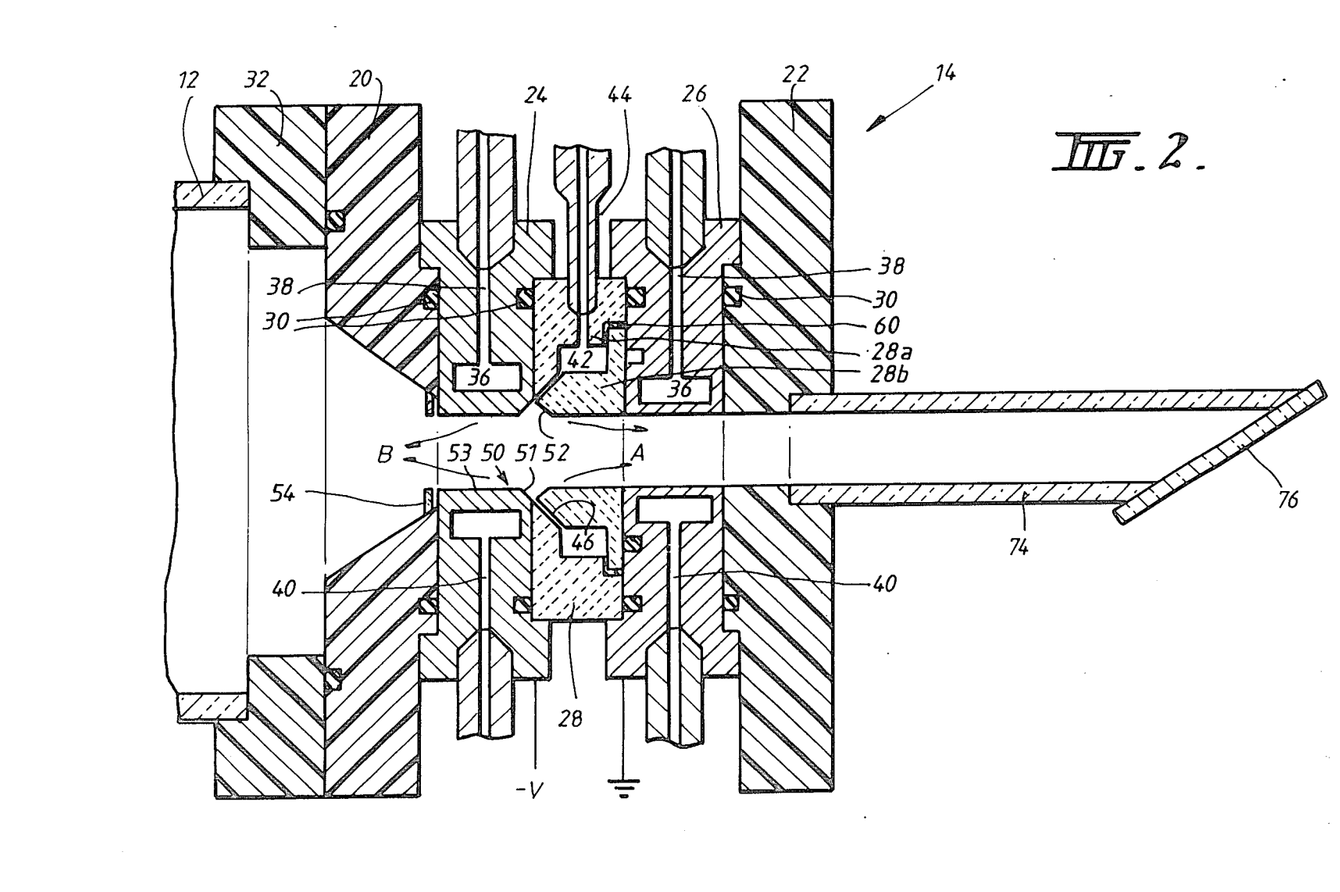
FIG. 2 is a detailed view of part of the laser of FIG. 1.

With reference to FIG. 2 which shows a detailed view of the sputtering device 14, the sputtering cathode 24 and anode 26 both have an internal annular chamber 36 which communicates with passages 38 and 40 for supplying a cooling medium such as water to the sputtering cathode 24 and anode 26 to cool the sputtering cathode 24 and anode 26. The water enters through passage 38, circulates about chamber 36, and exits through passage 40. Insulative ring 28 which is preferably formed from MACOR includes an annular chamber 42 which communicates with a passage 44 for supplying an inert gas such as Argon, Neon or the like or mixtures thereof to the chamber 42. The chamber 42 also communicates with a gas passage 46.

As is clearly shown in FIG. 2 the cathode 24 is provided with a sputtering surface 50 which is formed by a bevel 51 formed on an inner edge of the cathode 24 facing the anode 26 and an inner wall portion 53 of the cathode 24 extending from the bevel 51. The insulative ring 28 has a similar bevel 52 arranged on an inner edge adjacent the cathode 24. The beveled surfaces 51 and 52 form an annular V-shaped channel. The gas passage 46 extends between the chamber 42 in the insulative ring 28 and the beveled surface 52 adjacent to the sputtering surface 50 and is substantially parallel to the sputtering surface 50.

An insulative annular member 54 is provided on the inner surface of the cathode 24 between the sputtering surface 50 and the other side of the cathode 24 so as to restrict the discharge between the cathode 24 and anode 26 to the sputtering surface 50. A small gap may be provided between the member 54 and the cathode 24.

Upon application of a sputtering discharge to the sputtering cathode 24, a discharge occurs between the sputtering surface 50 and the anode 26 as shown by arrow A. The sputtering discharge produced between the sputtering surface 50 and the anode 26 sputters metal from which the surface 50 is formed or metal which is deposited on or formed from the surface 50 and the sputtered metal is entrained in a gas flow from passage 46 when the inert gas is supplied to the annular chamber 42 and the vacuum pump (not shown) is actuated to draw the gas into the optical cavity 12 as shown by arrow B. As is evident from FIG. 2 the gas flow from the passage 46 is substantially parallel to the bevel 51 and flows over the bevel 51 so that the vaporized metal is entrained in the gas flow which is drawn into the optical cavity 12 to form a collimated metal vapour beam in the optical cavity 12. Since the gas flow in the vicinity of the sputtering surface is substantially parallel to the bevel 51, the gas flow runs over the entire bevel 51 and ensures that a large concentration of sputtered metals is entrained in the gas flow to thereby ensure that there is a high population of metal atoms available for excitation in the metal vapour beam in the optical cavity 12. The provision of the annular wall portion 53 of the sputtering surface 50 increases the effective size of the cathode so as to increase the number of metal atoms sputtered and entrained in the gas flow. Attachment of the gas flow to the wall portion 53 of the sputtering surface 50 of the cathode is desirable and can be promoted by providing a plurality of small holes (not shown) in the wall portion 53 which are connected to a vacuum pump (not shown). The gas flow into the plurality of holes is kept relatively small compared with the flow shown by arrows B and drawn by the other vacuum pump connected at the other end of the optical cavity. Thus, attachment of the flow represented by arrows B to the wall portion 53 of the cathode surface 50 also tends to ensure that the gas flow is substantially parallel to the wall portion 53 as well as to the bevel 51 thereby ensuring a high concentration of metal atoms which are entrained in the gas flow. This arrangement allows a simpler cathode construction together with the advantage of simple change over of cathode 24. In this regard cathode 24 could be changed over by merely removing the bolts which hold the assembly together, removing the cathode from the assembly and inserting a new similarly shaped cathode in place thereof.

To ensure that the passage 46 is aligned correctly to the sputtering surface 50 so that it flows across the sputtering surface 50 and is substantially parallel thereto, the insulative ring 28 is formed in two parts 28a and 28b. The two parts have a matching stepped surface 60 at one side and are defined by the walls of the passage 46 on the other side. Disposed between the matching stepped surfaces 60 is a resilient pad 62. In order to correctly align the passage 46 the bolt extending between the support rings 20 and 22 can be tightened or loosened so that the portions 28a and 28b can alter their alignment relative to one another by pressing the resilient pads 62 to thereby slightly alter the alignment of the gas passage 46. Therefore the alignment of the gas passage 46 can be quickly and easily altered by simply adjusting the bolts extending between the support rings 20 and 22.

The collimated metal vapour beam which is formed in the optical cavity 12 is excited by a separate discharge which occurs between a plurality of pins 70 which extend along the optical cavity 12 and a grounded rail 72 which extends diametrically opposite to the pins 70. In other embodiments the rail 72 need not be grounded and a pulse transformer could be provided between a pulse driving circuit and the rail 72 and pins 70. Upon application of a suitable discharge voltage to the pins 70 a discharge will occur between the pins 70 and the grounded rail 72 which excites the metal vapour beam in the optical cavity 12.

Alternatively, a longitudinal discharge is produced between an electrode and each end of the optical cavity 12. One of these electrodes (the high voltage electrode) is adjacent to chamber 16 and the other (the grounded electrode) is adjacent to ring 32. Both electrodes protrude radially into cavity 12 so that they are presented close to the metal vapour beam to ensure that the discharge is concentrated on the beam.

Arranged concentrically with the opening in the anode 26, cathode 24 and insulative ring 28 as well as the support rings 20 and 22 is a tube 74 having a Brewster window 76 arranged at its end. As is shown the Brewster window 76 is inclined with respect to the longitudinal axis of the optical cavity. This embodiment of the invention provides a large working aperture which extends through the cathode 24, anode 26 and insulator 28 whilst at the same time ensuring maximum exposure of the sputtering surface 50 to the inert gas jet stream for entraining atoms into that jet stream for producing a metal vapour gas jet stream.

The sputtering means described with reference to FIGS. 1 and 2 entrains the metal atoms in a gas jet, to form a collimated metal vapour beam with a local concentration of the order of $10^{14}$ cm$^{-3}$. The gas flow, in this device, decouples the processes responsible for the sputtering and subsequent excitation of the metal atoms, allowing separate discharges and independent control of the metal atom density and excitation discharge current. The highest concentration achieved, at a current density of 550 mA cm$^{-2}$, is similar to that obtained at the same current density in hollow cathode metal ion sputtering lasers. However, the geometry of the hollow cathode discharge in a static gas requires a much larger cathode area to achieve a sufficient gain path, and necessitates a cathode current one to two orders of magnitude higher than is used in the preferred embodiment of the present invention.

The preionization provided by the gas jet, which has flowed through the sputtering discharge, causes the excitation discharge to concentrate on the metal vapour beam. This plays an essential role in ensuring that the current density of the excitation discharge is adequate for excitation of the laser transition.

The high metal atom ground state concentration, low metal requirement, and independent control of the sputtering and excitation currents, make this invention suitable as a source of metal vapour for self-terminating neutral laser transitions (e.g. copper $^2p3/2 \rightarrow ^2D5/2$, 510.6 nm).

Figure 3:
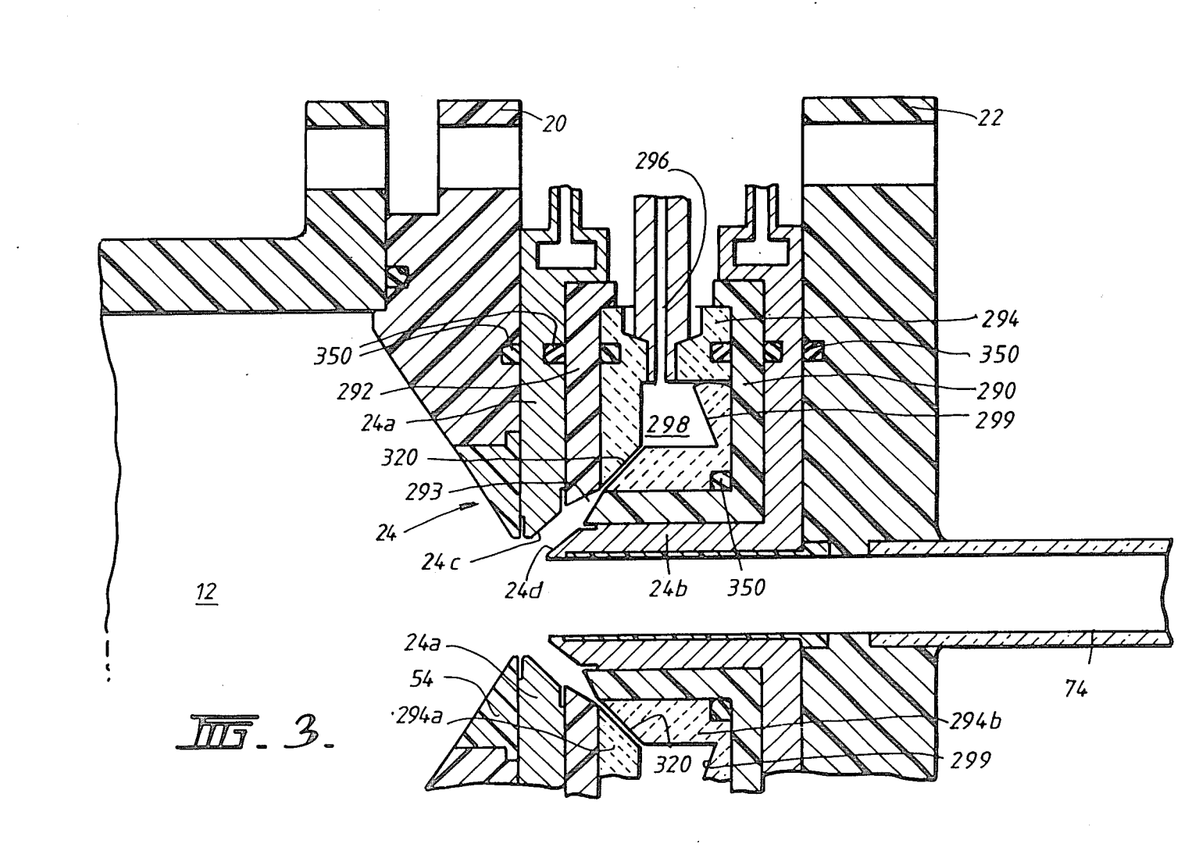
FIG. 3 is a view of a second embodiment.

FIG. 3 shows a further embodiment of the invention in which the sputtering cathode 24 is formed of a first cathode 24a and a second cathode 24b. The first and second cathodes 24a and 24b each have a surface 24c and 24d respectively which form an angle of about 45° to the axis of the optical cavity. The first and second cathodes are spaced apart by Leflon spacers 290 and 292 so that the surfaces 24c and 24d face one another but spaced from one another. The teflon spacers 290 and 292 have bevel surfaces which form a V-shaped groove 293 which forms a continuation of the space defined by the surfaces 24c and 24d. Located between the teflon spacers 290 and 292 is a ring 294 into which inert gas is introduced via an inlet passage 296. The ring 294 has a chamber 298 which has an annular passage 320 extending therefrom to the groove 293. An anode (not shown) is arranged downstream of the first and second cathodes 24a and 24b and a sputtering discharge is applied to the cathodes 24a and 24b. Upon application of the sputtering discharge a discharge takes place between the surfaces 24c and 24d to sputter the metal thereon. The gas which is introduced into the chamber 298 is allowed to flow out of the passage 320 into the groove 293 and between the surfaces 24c and 24d. The flow of gas is substantially parallel to the surfaces 24c and 24d and sputtered metal atoms are entrained in the gas flow to form a metal vapour stream in the optical cavity 12.

It should be noted that the first and second cathodes 24a and 24b can be cooled in the same manner as described with reference to FIGS. 1 and 2.

Figure 4:
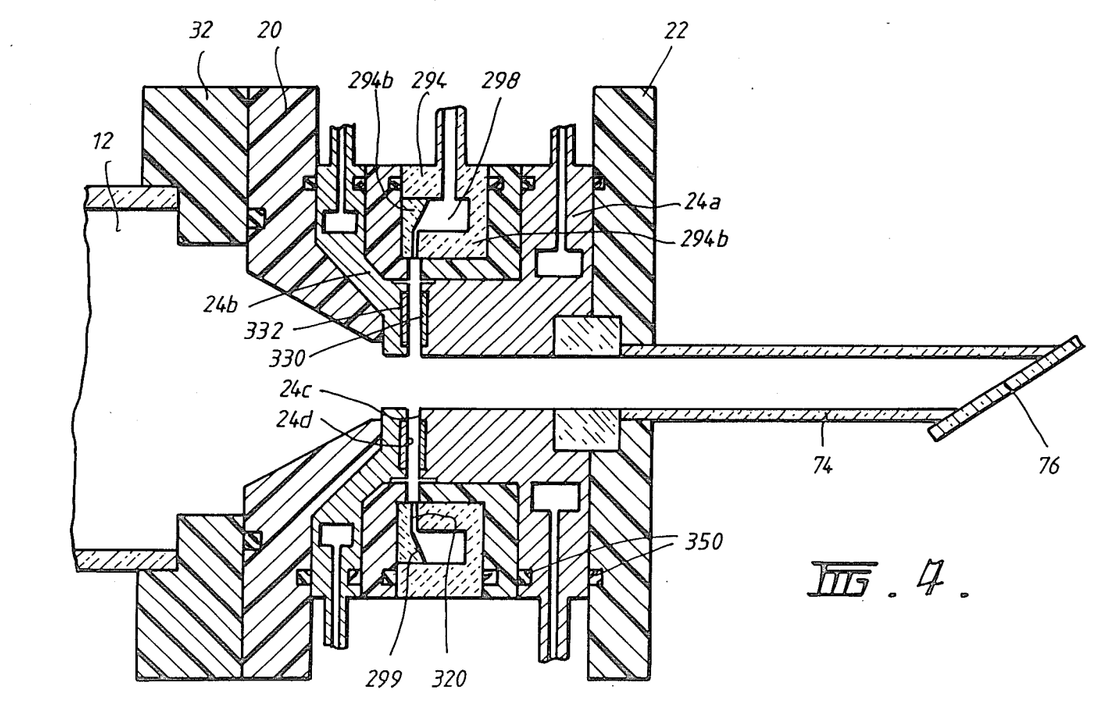
FIG. 4 is a view of a third embodiment.

FIG. 4 represents a similar embodiment to FIG. 3 in which two cathodes are utilized to form a hollow cathode. However in this embodiment (where like reference numerals indicate like parts to the embodiment of FIG. 3) the space between the first and second cathode surfaces 24c and 24d is perpendicular to the axis of the optical cavity rather than being arranged at an angle of about 45° to the optical cavity.

In this embodiment magnets 330 and 332 are arranged adjacent to the surfaces 24c and 24d. The magnets may be provided in recesses in the cathode with the sputtering metal located thereover or the magnets could merely be coated with the metal to be sputtered. The magnets are preferably permanent magnets and allow magnetron sputtering to take place. The magnets cause the electrons to execute a closed path and increase ionization. This enables the same sort of ionization at low background gas pressure as would have been achieved at high pressure without the magnets.

The magnets could also be used with the other cathode geometry shown in FIGS. 2 and 3. This can be important in that the magnetic field will have a component along the electric field of the discharge and a component perpendicular to the electric field. The latter component would give rise to a magnetron sputtering discharge.

Figure 5:
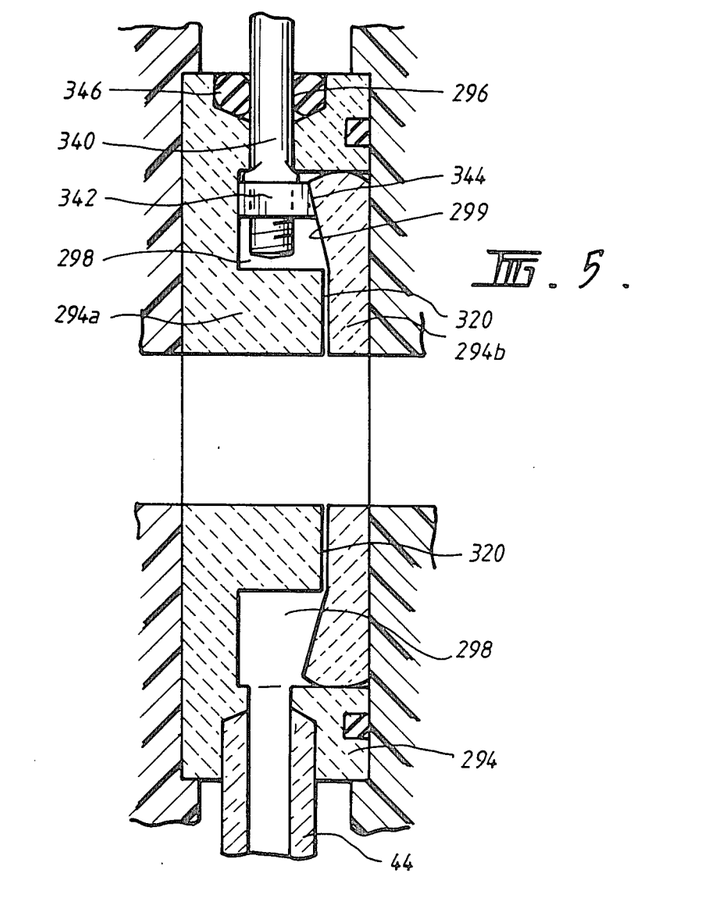
FIG. 5 shows a part of FIG. 4 in detail.

The ring 294 in FIGS. 3 and 4 is formed in two parts (294a and 294b) to define the passage 320 and the chamber 298. As is clear from FIGS. 3 and 4 the chamber 298 has an angled side wall 299. With reference to FIG. 5 which shows the chamber 298 formed in the ring 294 it will be seen that the chamber 298 receives an adjusting screw 340 which has an adjusting member 342. The member 342 has an angled side 344 which matches the angled wall 299. The adjusting screw is received in the annular inlet 296 and inlet tube 44. It should be clear that the adjusting member 342 does not fill all of the chamber 298 and will allow inert gas to flow around it in the annular chamber 298.

The adjusting screw 340 is used to adjust the passage 320 to allow inert gas to enter the hollow cathode defined by the first cathode 24a and second cathode 24b. By simply adjusting the adjusting screw 340 the adjusting member 342 is moved inwardly or outwardly and in view of a wedging action between the surface 344 and the wall 299 the portion 294b of the ring 294 is moved relative to the portion 294a so that the passage 320 is opened up or closed. The portions 294a and 294b are held in place by suitable O-rings 350 (see FIG. 3 and FIG. 4) and the wedging action between the member 342 and the wall 299 causes the portions 294a and 294b to move relative to one another by compression or expansion of the O-rings.

The separate cathodes 24a and 24b allows for different switching modes to be used with these embodiments of the invention. As shown with reference to FIG. 7 which schematically shows the cathodes 24a and 24b and a negative voltage V which may be applied to the cathode 24a whilst the cathode 24b floats to provide a discharge for a simple cathode/anode arrangement at low pressure and then the second cathode 24b can be switched on by voltage V' to form a hollow cathode with the first cathode 24a.

Figure 7:
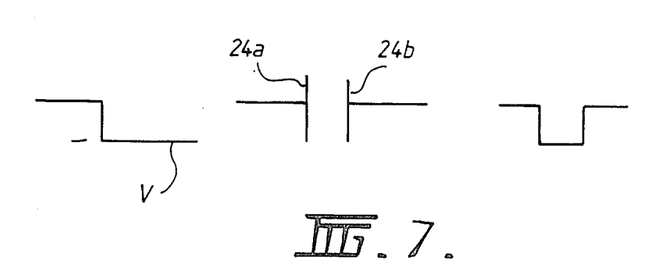
FIG. 7 is a diagram illustrating how pulses are applied in the embodiments of FIGS. 3 and 4.

The use of the hollowed cathode formed by the two cathode surfaces 24c and 24d enables a discharge therebetween which utilizes much less energy than the case of a single cathode. Furthermore, since a discharge occurs between the surfaces 24c and 24d, metal which is not entrained in the gas flow can remain on one or the other of the surfaces and is therefore not lost to the system since it can be re-sputtered at a later time.

FIG. 6 illustrates an arrangement for providing inert gas to the laser 10. In this arrangement at least two sources of gas 370 and 372 are provided. The source 370 may be argon and the source 372 may be neon. Gas sources 370 and 372 are connected to the laser 10 by lines 374 and 376 respectively as well as a common line 380. A flow switch 390 is provided in the line 374 and a flow switch 392 is provided in the line 376. Since argon is the most suitable gas to be used for sputtering the flow switch 390 is actuated to enable argon to pass from the source 370 to the laser 10 when sputtering is initiated and when a discharge is to take place for exciting the metal vapour entrained in the laser 10 the flow switch 392 can be actuated and the flow switch 390 deactivated so that neon flows into the laser 10 and entrains a sputtered metal vapour for excitation by the excitation discharge. It should be noted that sputtering continues to take place during excitation after it has been initiated in the more ideal conditions of low pressure Argon gas. The flow switches 390 and 392 may be actuated from the same circuit which provides the sputtering discharge and the excitation discharge so that the flow switches are opened and closed at the appropriate time. By arranging suitable delays between sputtering and excitation discharges and opening and closing of the flow switches 390 and 392 the arrangement described in FIG. 6 can allow the appropriate gas to arrive at the sputtering cathode and be in the laser cavity when sputtering and excitation discharges are taking place. To provide smooth flow of gases through the laser 10 it may be desirable to constantly bleed a small amount of each of the gases into the laser and to enable this to take place bleed lines 395 are arranged between the sources 370 and 372 and the line 380. This embodiment of the invention enables a pulsed flow of inert gas mixture which entrains the metal atoms which results in a significant reduction in the size of the pump P and the storage cylinders storing the gases. More importantly, it will be possible to optimize the sputtering and entrainment processes by more efficient use of gases such as neon and krypton and will allow the use of magnetron sputtering in argon to increase the metal concentration together with a more effective laser pumping discharge in neon.

Since the excitation discharge occurs periodically for a small interval of time, it is only necessary to allow expensive neon or krypton gas to enter the laser periodically for small time intervals and therefore a considerable saving of expensive gas is achieved.

The preferred embodiment of the present invention provides the following advantages:

Separate electrical discharges for producing metal vapour and for exciting the metal vapour which provides great flexibility in the control of the concentration of the excitation discharge.

Hence combinations such as a dc sputtering discharge with a dc exciting discharge (continuous-wave metal ion laser) or a dc sputtering discharge with a pulsed exciting discharge (pulsed neutral metal atom laser) would be possible.

In view of the provision of the separate electrical discharges and in particular a sputtering discharge for producing the metal vapour and for exciting the vapour the device can operate at room temperature whereas many of the prior art devices require the application of extremely high temperatures to produce the metal vapour.

Sputtering of the cathode enables a wide range of metals or alloys or even compounds to be used as an excitation medium in the laser and also enables simultaneous operation using several different metals. Furthermore the vapour pressure of each of the different metals can be separately controlled and varied independently on a time scale of 10 milliseconds so allowing the colour composition of the laser beam to be varied on the same time scale.

The present device is also simple in structure and inexpensive to produce.

Technical simplicity of construction would result from room temperature operation. Specifically, the design of a transversely-excited laser tube for pulsed neutral metal atom transitions would be considerably simplified.

The threshold discharge current for a continuous-wave laser would be significantly reduced due to more efficient sputtering and due to the independent optimization of the sputtering and excitation processes.

Simultaneous operation on several wavelengths, e.g. a white light laser, could be achieved by means of separate, independently optimized sputtering of the appropriate metals. This would allow independent control of the partial pressure of each metal in the vapour.

A wide range of metals can be sputtered. The gas-jet assisted sputtering enables "difficult" metals such as aluminium to be efficiently sputtered. Thus the underlying concept of this laser could be applied to most metals and should permit the operation of new transitions.

In particular, access may be had to neutral metal atom laser transitions in the blue and ultraviolet region of the spectrum which would be otherwise ruled out by the thermal population of the lower laser level which is associated with the higher operating temperatures of thermally loaded systems.

Since modifications within the spirit and scope of the invention may readily be effected by persons skilled within the art, it is to be understood that this application is not limited to the particular embodiment described by way of example hereinabove.

What is claimed is:

1. A metal vapour laser having an optical cavity, a sputtering cathode at one end of said optical cavity and having a sputtering surface, means for introducing a gas stream into said optical cavity, discharge means for creating a discharge to sputter metal deposited on the sputtering surface or from which the sputtering surface is formed, said introducing means having first and second portions which define an outlet passage therebetween, said outlet passage having an exit adjacent said sputtering surface and being aligned so that said gas stream flows over said sputtering surface substantially parallel to said sputtering surface to entrain metal sputtered from said sputtering surface into said gas stream to create a metal vapour beam, means for moving said first portion of the introducing means relative to the second portion of the introducing means to thereby align the passage defined by the first and second portions with the sputtering surface so that said gas stream flows substantially parallel to said sputtering surface.

2. The laser of claim 1, wherein said optical cavity has a longitudinal axis, said sputtering surface is formed by a beveled surface portion extending transverse to the longitudinal axis of the optical cavity and said sputtering cathode has a second sputtering surface defined by a wall surface portion extending from said beveled surface portion substantially parallel to the longitudinal axis of the optical cavity on said cathode which thereby forms an annular sputtering surface.

3. The laser of claim 1, wherein said introducing means also includes an annular chamber which communicates with said outlet passage, said outlet passage extending from said annular chamber towards said sputtering surface and substantially parallel with said sputtering surface.

4. The laser of claim 3, wherein said introducing means has a beveled surface adjacent to said sputtering surface which is beveled complementary to said sputtering surface such that said sputtering surface and said beveled surface of the introducing means form an annular V-shaped space and said outlet passage communicates with said V-shaped space at a point adjacent the apex of said V-shaped space.

5. The laser of claim 4, wherein there is included an anode located on the opposite side of said introducing means to said sputtering cathode and said introducing means is sandwiched between the anode and sputtering cathode.

6. The laser of claim 1, wherein at least two sources of gas are provided for supplying gas to said introducing means, and further including switching means for selectively switching each of the sources of gas so that the sources of gas are connected to the metal vapour laser.

7. The laser of claim 6, wherein said switching means are flow switches further including means for providing an excitation discharge and wherein the flow switches are actuated in synchronism with the sputtering discharge and the excitation discharge for exciting said metal vapour beam.

8. The laser of claim 1, wherein said sputtering cathode includes a first cathode and a second cathode, said first and second cathodes being spaced from one another and having surfaces which define a hollow cathode, at least one of said surfaces having said metal deposited thereon or being formed from said metal, such that the discharge to sputter said metal occurs between the surfaces of the hollow cathode.

9. The laser of claim 8, wherein said surfaces are arranged at an angle of about 45° to the axis of said optical cavity.

10. The laser of claim 8, wherein said surfaces are arranged substantially normal to the axis of the optical cavity.

11. The laser of claim 1, wherein said means for moving said first portion relative to the second portion comprises resilient pad means located between the first and second portions so that the first and second portions can be moved relative to one another against the bias of the resilient pad means to adjust the alignment of the outlet passage.

12. The laser of claim 1, wherein said means for moving the first portion relative to the second portion comprises an adjusting screw having an inclined surface for engagement with an inclined surface on one of said first or second portions, said adjusting screw being movable relative to the inclined surface of the first or second portion to create wedging action to thereby move one of the portions relative to the other of the portions.

* * * * *